UNITED STATES PATENT OFFICE.

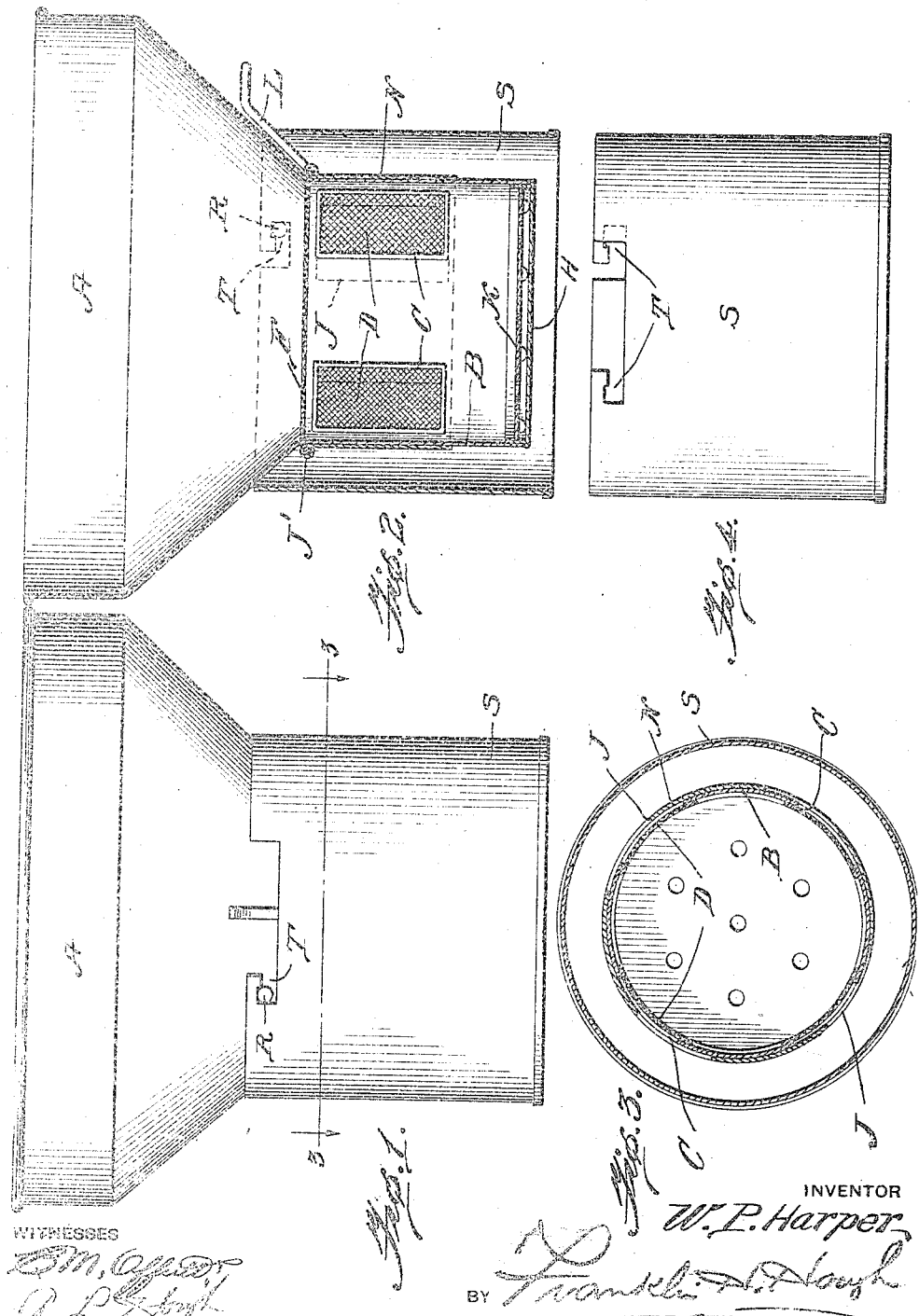

WILLIAM P. HARPER, OF ABILENE, KANSAS.

APPARATUS FOR CLEANSING AND REMOVING SEDIMENT FROM MILK.

1,238,013.

Specification of Letters Patent.

Patented Aug. 21, 1917.

Application filed May 12, 1917. Serial No. 168,229.

*To all whom it may concern:*

Be it known that I, WILLIAM P. HARPER, a citizen of the United States, residing at Abilene, in the county of Dickinson and State of Kansas, have invented certain new and useful Improvements in Apparatus for Cleansing and Removing Sediment from Milk; and I do hereby declare the following to be a full, clear, and exact description of the invention, such as will enable others, skilled in the art to which it appertains to make and use the same, reference being had to the accompanying drawings, and to the letters and figures of reference marked thereon, which form a part of this specification.

This invention relates to new and useful improvements in devices for cleansing and removing sediment from milk, etc., and consists in the provision of various details of construction, combinations and arrangements of parts which will be hereinafter fully described, shown in the accompanying drawings and then specifically defined in the appended claim.

My invention is illustrated in the accompanying drawings, in which—

Figure 1 is a side elevation of the device.

Fig. 2 is a central sectional view.

Fig. 3 is a horizontal sectional view.

Fig. 4 is a detail in elevation of the outer sheath or shell removed.

Reference now being had to the details of the drawings by letter, A designates a hopper-shaped member having a cylindrical portion B with openings C arranged at intervals from each other therein, and each covered by a screen D. F designates a screen formed in the hopper intermediate the flaring and cylindrical portions thereof. The bottom is designated by letter H and is flanged and telescopes within the bottom. A filter disk, designated by letter K, is mounted within the cylindrical receptacle and provided with perforations and lugs upon its under surface which support the same above the bottom upon which it rests.

Mounted to have an oscillating movement about the cylindrical portion of the device is a collar N which is cylindrical-shaped and provided with openings J, which are of a size equal to the area of the screen-covered openings in said cylindrical portion and form means for opening and closing the screened openings. The upper end of said collar is provided with a beading J', and L is a handle projecting from the beading. Lugs R project from the flaring portion of the hopper member at points diametrically opposite and are adapted to rest in the angled slots T formed in the cylindrical sheath or shell S which supports the hopper member, said lugs being adapted to engage in the slots to hold the same in place. Said handle projects through one of the slots, which is elongated, and provides means whereby the collar may be turned upon the cylindrical portion of the hopper while the same is mounted in the outer shell or sheath.

In operation, the device is adapted to be placed in a pan or receptacle and milk poured into the hopper will pass through the screen F and into the cylindrical receptacle beneath. When the milk is poured into the device the collar is so positioned with reference to the screen covered openings, that the latter will be closed, permitting the milk to stand in the cylindrical portion where it will remain still, and any sediment or formed matter, which may be contained in the milk, will settle in the space beneath the screened openings and the heavier particles passing beneath the filter disk K. After the milk has stood a required length of time for the purpose of settling thereof, the collar may be operated to bring the openings in the collar into registration with the screen covered openings in the cylindrical part of the device, thus allowing the milk to make exit into the spaces between the cylindrical portion B and the shell S and into the pan or other receptacle in which the device may be placed. After the milk has been racked off, it will be noted, that as the milk flows through the screened openings it will not disturb any sediment which may gravitate to the bottom of the cylindrical part B. When the milk has been poured off the device may be taken out of the pan and the sediment removed.

What I claim to be new is:

An apparatus for cleansing and removing sediment from milk, etc., comprising a hopper with a cylindrical shaped portion having a closed bottom and provided with screen covered openings having their lower ends spaced from the bottom of said cylindrical portion, an oscillating shell with a beading at the upper end thereof movable about the cylindrical portion of the hopper, and provided with openings designed to register with said screen covered openings, a perforated filter disk provided with feet to support the same above the bottom of the hopper, a handle projecting from said beading, an open ended shell upon the top of which the inclined portion of the hopper is adapted to rest supporting the lower end of the cylindrical part thereof above the bottom of said shell, the latter being provided with a slot in the upper edge thereof in which the outwardly inclined portion of said handle is adapted to have a limited movement, as set forth.

In testimony whereof I hereunto affix my signature in presence of two witnesses.

WILLIAM P. HARPER.

Witnesses:
G. W. REES,
CECIL TAYLOR.